United States Patent [19]

Inao

[11] Patent Number: 6,021,696

[45] Date of Patent: Feb. 8, 2000

[54] SLICING METHOD FOR ADJUSTING A FORCE APPLIED TO AN OBJECT

[75] Inventor: Takeshi Inao, Shiga-ken, Japan

[73] Assignee: Murata Manufacturing Co., Ltd., Nagaokakyo, Japan

[21] Appl. No.: 08/941,349

[22] Filed: Sep. 30, 1997

[30] Foreign Application Priority Data

Nov. 6, 1996 [JP] Japan ..................................... 8-311300

[51] Int. Cl.⁷ ...................................................... B26D 1/00
[52] U.S. Cl. .................................. 83/13; 83/74; 83/76.7; 83/367
[58] Field of Search ............................... 83/72, 74, 76.1, 83/76.7, 367, 13, 875, 880, 886, 887

[56] References Cited

FOREIGN PATENT DOCUMENTS 1 228 986  11/1966  Germany .

Primary Examiner—M. Rachuba
Attorney, Agent, or Firm—Burns, Doane, Swecker & Mathis, LLP

[57] ABSTRACT

A slicing method and slicing apparatus eliminate occurrence of cracking and/or chipping of a to-be-machined object without reducing the processing speed thereof. To this end, the slicing method comprising cutting the to-be-machined object W by supporting the to-be-machined object W on a table 10 and causing this table 10 to travel in an x-axis direction while allowing a slicing blade 20 to rotate at a predetermined position. A sensor 12 detects a variable load F that the to-be-machined object receives during slicing and an actuator 11 operatively responds to receipt of a detection signal of the sensor 12. The actuator 11 forces the to-be-machined object W to deform in a direction which permits reduction of the aforesaid variable load F. The actuator is provided between the sensor 12 and table 10, or alternatively between the to-be-machined object W and sensor 12.

10 Claims, 5 Drawing Sheets

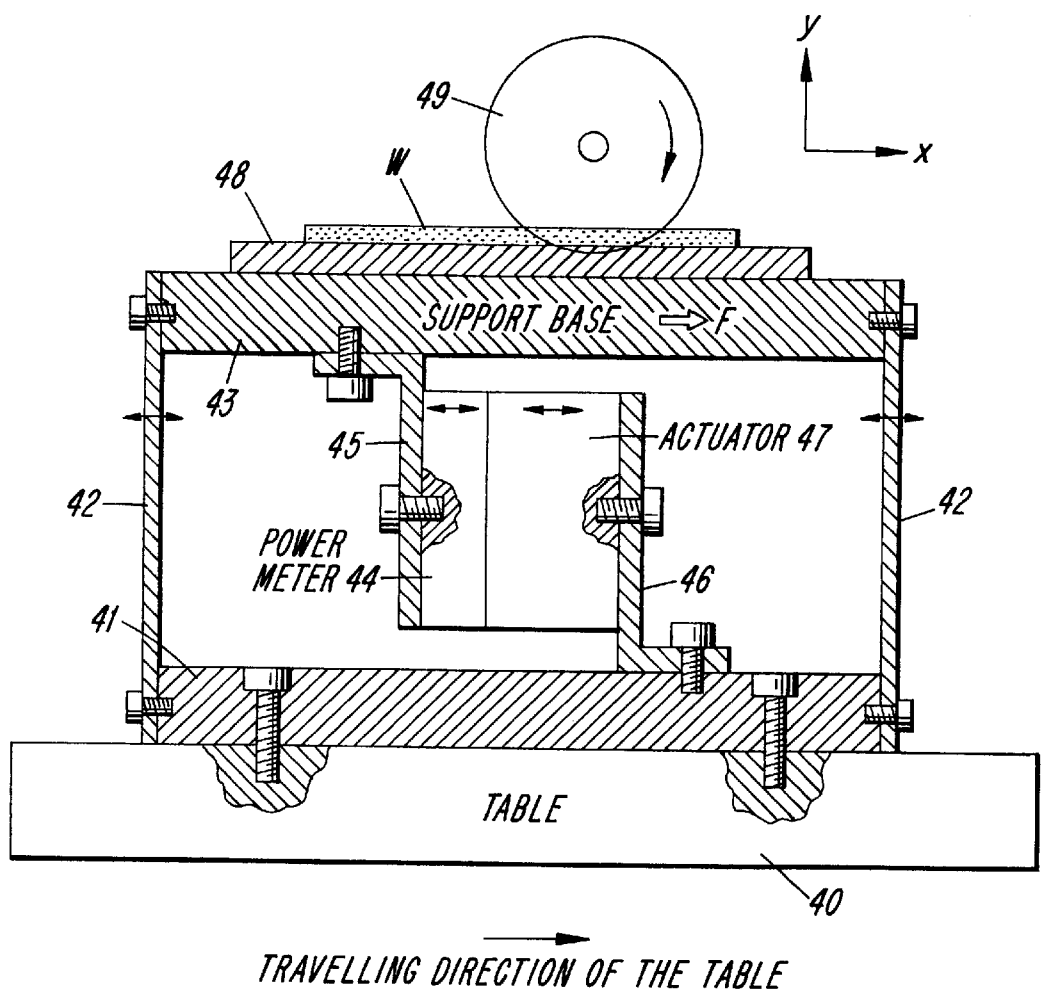

SLICING METHOD FOR ADJUSTING A FORCE APPLIED TO AN OBJECT

This application is based on Japanese Patent Application No. 8-311300, filed on Nov. 6, 1996, which is incorporated herein in its entirety by reference.

BACKGROUND OF THE INVENTION

1. Field of the Invention

The present invention relates to a slicing method and slicing apparatus adaptable for use in cutting and separating an object to be machined, such as a ceramics wafer, for example.

2. Description of the Prior Art

Conventionally, in order to obtain a great number of chips by cutting and separating a ceramics wafer, a slicing apparatus shown in FIG. 1 has been employed. This slicing apparatus is constructed such that a wafer 2 comprising an object to be machined is bonded onto a self-adhesive sheet 1, which sheet is held by suction force above a slicing table 3. The table 3 is driven by a ball screw mechanism or the like to move in the x-axis direction, thereby cutting the wafer 2, while, at the same time, a slicing blade 4 consisting of a rotary blade rotates at a predetermined position.

When the slicing apparatus is used for cutting the wafer 2, decentering D of the slicing blade 4 and/or x- and y-axis directional vibrations of a principal shaft 5 which drives the slicing blade 4 can occur, which can affect the cutting/polishing operation. This can result in an increase in variation of the load as applied to the wafer 2. Accordingly, the apparatus has a problem in that the wafer 2 can crack or suffer from a "chipping" phenomenon. One available approach to avoid this problem is to reduce the machining speed; however, this has the negative consequence of reducing productivity.

SUMMARY OF THE INVENTION

It is therefore an object of the present invention to provide a slicing method and slicing apparatus capable of eliminating cracking and chipping of a to-be-machined object without having to reduce the machining speed.

To attain the foregoing object, the slicing method of the instant invention comprises a slicing method for cutting an object to be machined by supporting the to-be-machined object on a table, causing this table to travel in an x-axis direction, and causing a slicing blade to rotate at a predetermined position. The method features the steps of detecting a variable load as received by the to-be-machined object during slicing, and deforming, responsive to the variable load as detected in the above step, the to-be-machined object in a direction in which this variable load decreases.

The to-be-machined object is cut into portions by holding it on the table which is driven to travel in the x-axis direction while causing the slicing blade to rotate at a predetermined position. At this time, the to-be-machined object might vary in cutting amount due to occurrence of decentering of such slicing blade and/or possible vibrations of the principal rotatory shaft, which would result in variation of a load as applied to the to-be-machined object. To avoid this, with respect to a variable load that this to-be-machined object receives, the to-be-machined object is forced to deform in a specific direction which permits reduction of the load. As a result, the cut-away speed of such to-be-machined object is rendered stable, thus stabilizing any load applied to the to-be-machined object. As a result, it becomes possible to increase the machining speed while eliminating occurrence of cracking and chipping of the to-be-machined object, which in turn enables achievement of high-speed slicing operations.

An apparatus for practicing the above slicing method uses a sensor for detecting a variable load received by the to-be-machined object during slicing. The sensor can be provided between the to-be-machined object and the table. An actuator is also provided, which is responsive to a detection signal generated by the sensor. The actuator deforms the to-be-machined object in the direction which reduces the variable load between the sensor and the table or alternatively between the to-be-machined object and the sensor.

As the actuator of the aforesaid slicing apparatus, a piezoelectric actuator can be used having excellent responsiveness.

In accordance with one aspect of the invention, the direction of the variable load that the to-be-machined object receives may include three directions: a y-axis direction (cut-in depth direction), z-axis direction (principal-shaft thrust direction), and x-axis direction (cutting-forward direction). In view of this, it would be desirable to employ a sensor which detects at least one of the x- and y-axis directional load components of the load components the to-be-machined object receives, because of the fact that the principal-shaft thrust load may be almost negligible.

In other embodiments, the slicing apparatus is also provided with a filter for extracting from a detection signal of the sensor only those variable components of the load applied to the to-be-machined object, and phase inversion means for phase-inverting an output of the filter and for outputting this phase inverted signal to the actuator. More specifically, since the detection signal of the sensor contains therein various kinds of signals other than the load received by the to-be-machined object, a frequency filter having a desired pass-through band is employed to exclusively extract a variable component of cut-away resistance (load) as produced by such slicing. (The term "cut-away resistance" generally refers to a resistance force applied to a cutting device when the device applies force to a material in the course of processing the material). If the resulting variable component of cut-away resistance thus extracted is directly output to the actuator, then the actuator will operate in the direction which causes the cut-away resistance to increase. Accordingly, the output of the filter is subjected to phase inversion before outputting to the actuator thereby enabling the actuator to operate in a direction which permits reduction of the cut-away resistance.

A method of reducing the variable load that the to-be-machined object receives includes the steps of attaching onto the table a sensor for detection of a y-axis directional load applied to the to-be-machined object, and providing a vertical drive actuator between the sensor and table or alternatively between the sensor and the to-be-machined object, which actuator is operatively responsive to a detection signal of the sensor for causing the to-be-machined object to deform in the y-axis direction. In this case, it becomes possible to reduce the variable load by deforming the to-be-machined object in the y-axis direction.

In accordance with a further aspect of the invention, a method is also available which includes the steps of providing an x-axis directionally deformable support base on the table, attaching to this support base a sensor which detects an x-axis directional load component, and providing a drive actuator for driving the support base in the x-axis direction between the table and the support base. In this case, it is possible to reduce the variable load by forcing the to-be-machined object to deform in the forward and backward directions.

In either case, high-precision control is attainable with an associative circuit configuration simplified because of the fact that the direction of the load received by the to-be-machined object and the actuator's deformation direction are identical to each other.

These and other objects, features and advantages of the invention will be apparent from the following more particular description of preferred embodiments of the invention, as illustrated in the accompanying drawings.

BRIEF DESCRIPTION OF THE DRAWINGS

FIG. 6 is a side view diagram of a third exemplary embodiment of the slicing apparatus of the invention.

DETAILED DESCRIPTION OF THE INVENTION

Figure 1:
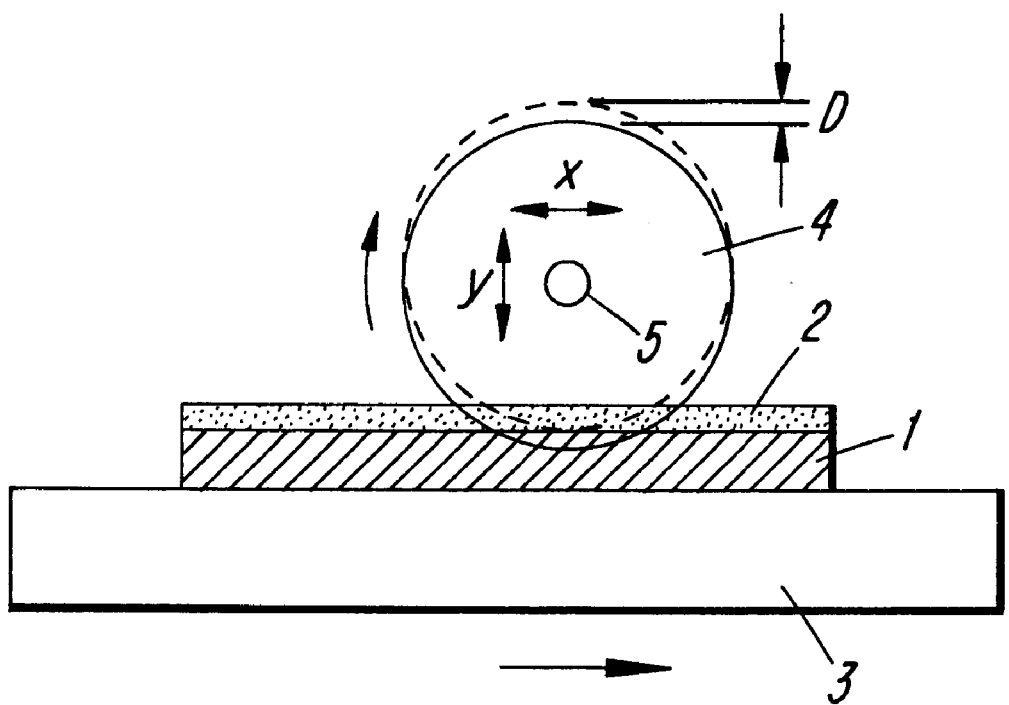
FIG. 1 is a side view diagram showing an operation of one prior art slicing apparatus.
Figure 2:
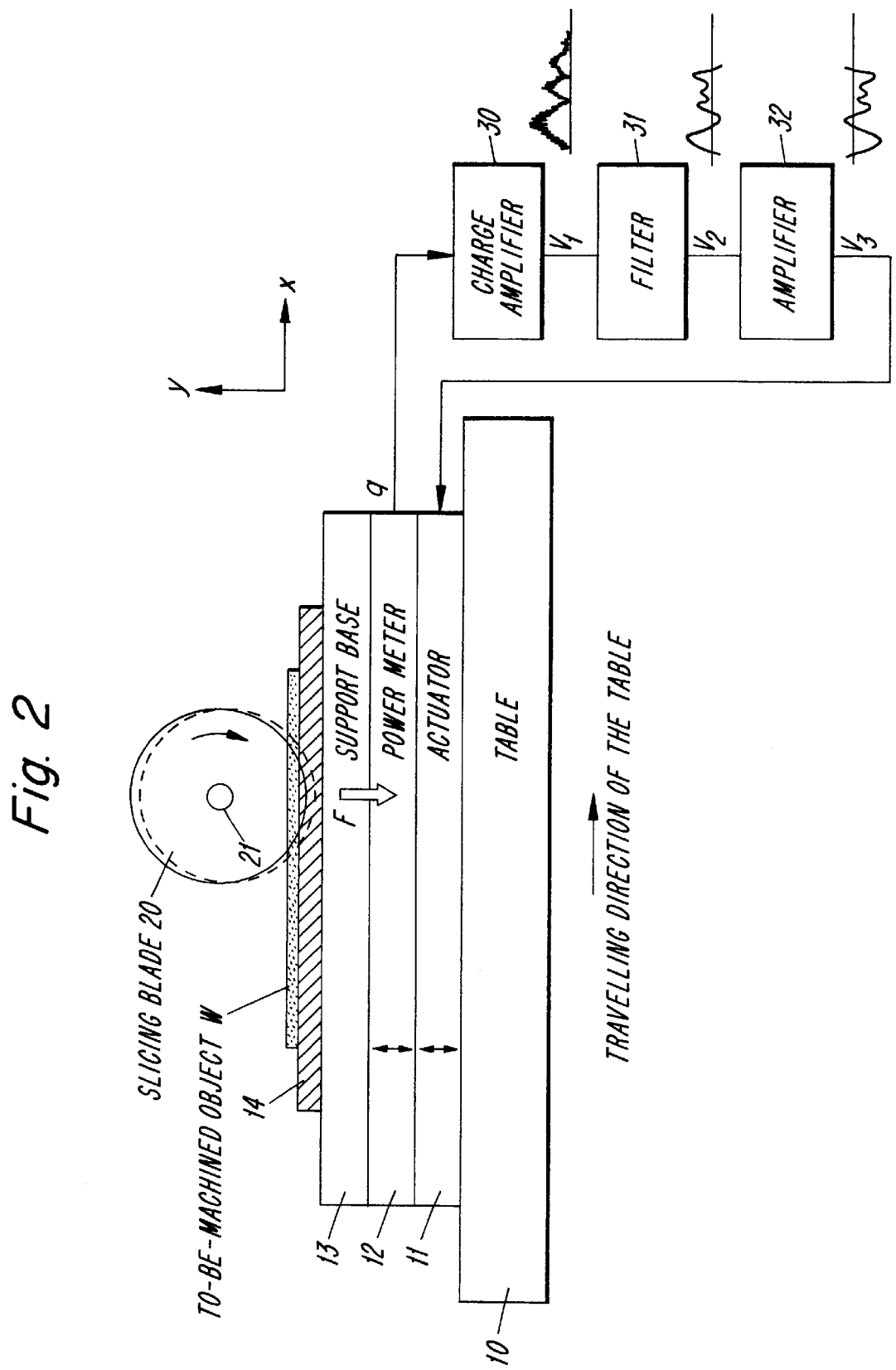
FIG. 2 is a side view diagram of a first exemplary embodiment of a slicing apparatus in accordance with the present invention.

FIG. 2 shows one example of a slicing apparatus in accordance with the present invention.

A table 10 is driven by a drive mechanism (not shown), such as a ball screw mechanism, at a constant rate in the horizontal direction (x-axis direction). A piezoelectric actuator 11 which is deformable in the upward and downward directions (y-axis direction), a piezoelectric power meter 12 for detection of a y-axis load component, and a support base 13 of the vacuum chuck type are sequentially stacked and fixed on the table 10. A self-adhesive sheet 14 is held by suction force on the support base 13. An object to be machined W (i.e. a "to-be-machined object"), such as a ceramic wafer or the like, is held on the top surface of the adhesive sheet 14, by the adhesion force thereof.

The piezoelectric actuator 11 is deformable in the y-axis direction upon input of an electrical signal thereto. Preferably, this actuator is highly responsive and exhibits a certain deformation amount which corresponds to the decentering amount of a slicing blade and variation amount of a principal rotary shaft, as will be described later. The power meter 12 is a known sensor which has a built-in piezoelectric body (crystal plate, by way of example) housed in a casing, which body is operatively responsive to application of a y-axis directional load. The power meter operates to generate and issue a signal (charge carriers) proportional to a y-axis directional variable load that the to-be-machined object W receives, as will be described later. The support base 13 is formed using a chosen porous material, and is connected to a vacuum suction device not shown. With such an arrangement, it is possible to stably hold by suction force the adhesive sheet 14 mounted on the top surface while at the same time enabling easy detachment of the sheet 14 by interrupting such vacuum suction force.

It should be noted that the stacking order of the actuator 11 and power meter 12 may be reversed.

While in the above explanation the sheet 14 is directly put on the support base 13, the apparatus may alternatively be configured in a way such that in order to support the sheet 14 with an increased positioning accuracy, the sheet 14 is held on a frame-like sheet support jig, by way of example, allowing this sheet support jig to be mounted on the support base 13.

A slicing blade 20 is rotatably attached to a rotary principal shaft 21 which extends horizontally above the to-be-machined object W. The principal shaft 21 is coupled to a drive source (not shown) such as a motor, which drives the shaft in a direction as designated by the arrow.

The power meter 12 operates to convert a cut-away resistance F into a corresponding electrical charge signal q, wherein the resistance F is a reaction force or counter-force to the polishing/cutting force due to decentering of the slicing blade 20. The charge signal q is input to a charge amplifier 30, which then amplifies and converts the charge q to a voltage signal $V_1$. Next, this voltage signal $V_1$ is input to a filter 31, which extracts therefrom only a cut-away resistance F component and generates a signal $V_2$. More specifically, the filter extracts only a signal or signals within a frequency band of from approximately 100 to 4 kHz, by way of example. Next, the extracted voltage signal $V_2$ is amplified by an amplifier 32 to a control voltage for input to the piezoelectric actuator 11 while also phase inverting this signal to produce a signal $V_3$. This phase inversion is performed to cause the piezoelectric actuator 11 to decrease in size or "shrink" in the y-axis direction when the cut-away resistance F is positive in polarity. The phase-inverted voltage signal $V_3$ is input to the piezoelectric actuator 11.

With respect to a variation of the force F which acts on the to-be-machined object W during slicing operations as described above, it is possible, by deforming the to-be-machined object W in the direction which reduces (i.e. counteracts) deformation, to flatten the cut-away resistance F or suppress a peak value thereof, thus eliminating the cracking and chipping of the to-be-machined object W.

For the purpose of verifying the effects of the present invention, a cutting experiment was carried out under specific experimental criteria, which are described as follows:

| Items | Experimental Criteria |
| --- | --- |
| To-Be-Machined Object | Ceramic Wafer |
| Principal Shaft Rotation Number | 30,000 rpm |
| Table Speed | 30 mm/sec. |
| Cutting Depth | 0.05 mm |

Figure 3A:
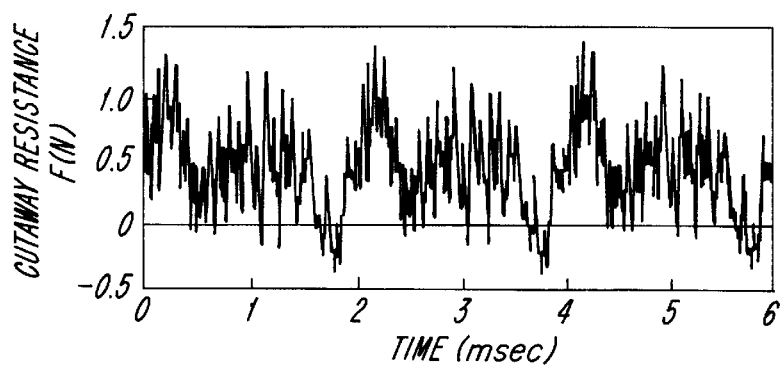
FIGS. 3a and 3b are signal waveform diagrams of a case in which no deforming control is performed in the slicing apparatus of FIG. 2.
Figure 3B:
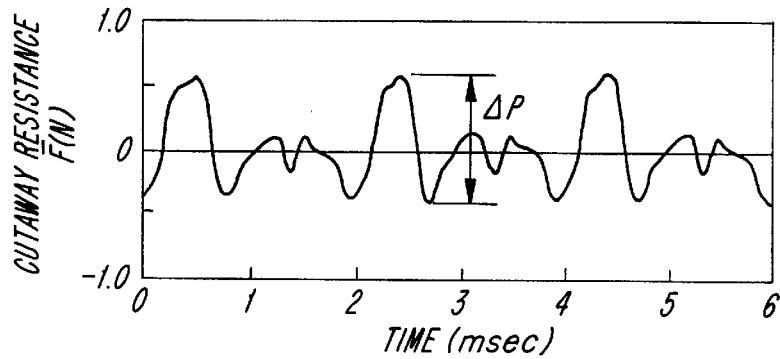

Part (a) of FIG. 3 shows an output waveform $V_1$ of the charge amplifier 30 in a case where no deformation control is effectuated for the to-be-machined object W, whereas FIG. 3(b) is an output waveform $V_2$ of the filter 31.

Figure 4A:
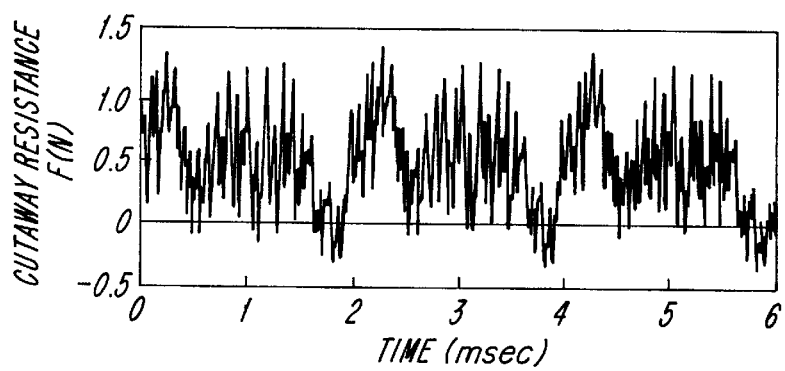
FIGS. 4a and 4b are signal waveform diagrams of a case in which the deforming control is performed in the slicing apparatus of FIG. 2.
Figure 4B:
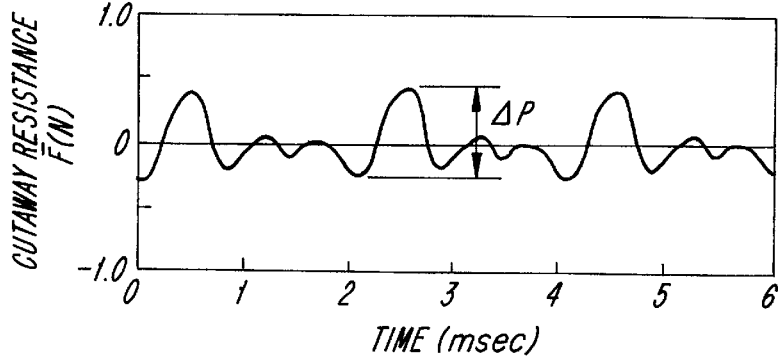

Part (a) of FIG. 4 demonstrates an output waveform $V_1$ of the charge amplifier 30 in a case where the deformation control is carried out for the to-be-machined object W, whereas FIG. 4(b) is an output waveform $V_2$ of the filter 31.

As apparent from the part (b) of FIG. 3 and part (b) of FIG. 4, a peak value $\Delta P$ of the cut-away resistance was reduced by approximately 30% from 1N down to 0.73N due to the effect of the deformation control. Note here that while a piezoelectric actuator which deforms by approximately 0.8

μm upon application of a voltage of 26 V was employed as the actuator 11 in this experimentation, the resulting deformation was as small as about 0.3 μm at 10 V due to an experimentally used limitation on amplifier output. Under an assumption that the decentering of the slicing blade 20 is approximately 2 μm, the cut-away resistance will be able to further decrease if the deformation amount of piezoelectric actuator 11 can be further increased.

Also, a slight response delay can take place during a time period spanning from inputting a control signal to the piezoelectric actuator 11 via the charge amplifier 30, filter 31 and amplifier 32 after detection of the cut-away resistance F at the power meter 12 until the actual occurrence of deformation of the to-be-machined object W. In this case, employing a simplified analog circuit such as a differentiation circuit can help eliminate or suppress such response delay, thereby making it possible to attain control with further enhanced accuracy.

The to-be-machined object W is held above the power meter 12 with the support table 13 and adhesive sheet 14 interposed therebetween. Due to such arrangement, a concern is that the load F the to-be-machined object W receives is caused by the adhesive sheet 14 to be placed in a damping state, which might result in a decrease in sensitivity of the power meter 12. Fortunately, such a damping of load F actually remains minimized, thereby avoiding a decrease in sensitivity, because of the fact that the support base 13 is typically high in mechanical strength or "stiffness". Moreover, the adhesive sheet 14 is an extra-thin sheet which measures approximately 0.1 to 0.2 mm in thickness.

It should also be noted that while the deformation of the piezoelectric actuator 11 is transferred to the to-be-machined object W via the power meter 12, support base 13 and adhesive sheet 14, such deformation is hardly absorbed by these components since the power meter 12 and support base 13 remain high in stiffness and, at the same time, the adhesive sheet 14 is extremely thin. Accordingly, the positional variation or deformation may be passed to the to-be-machined object W at increased efficiency.

Figure 5:
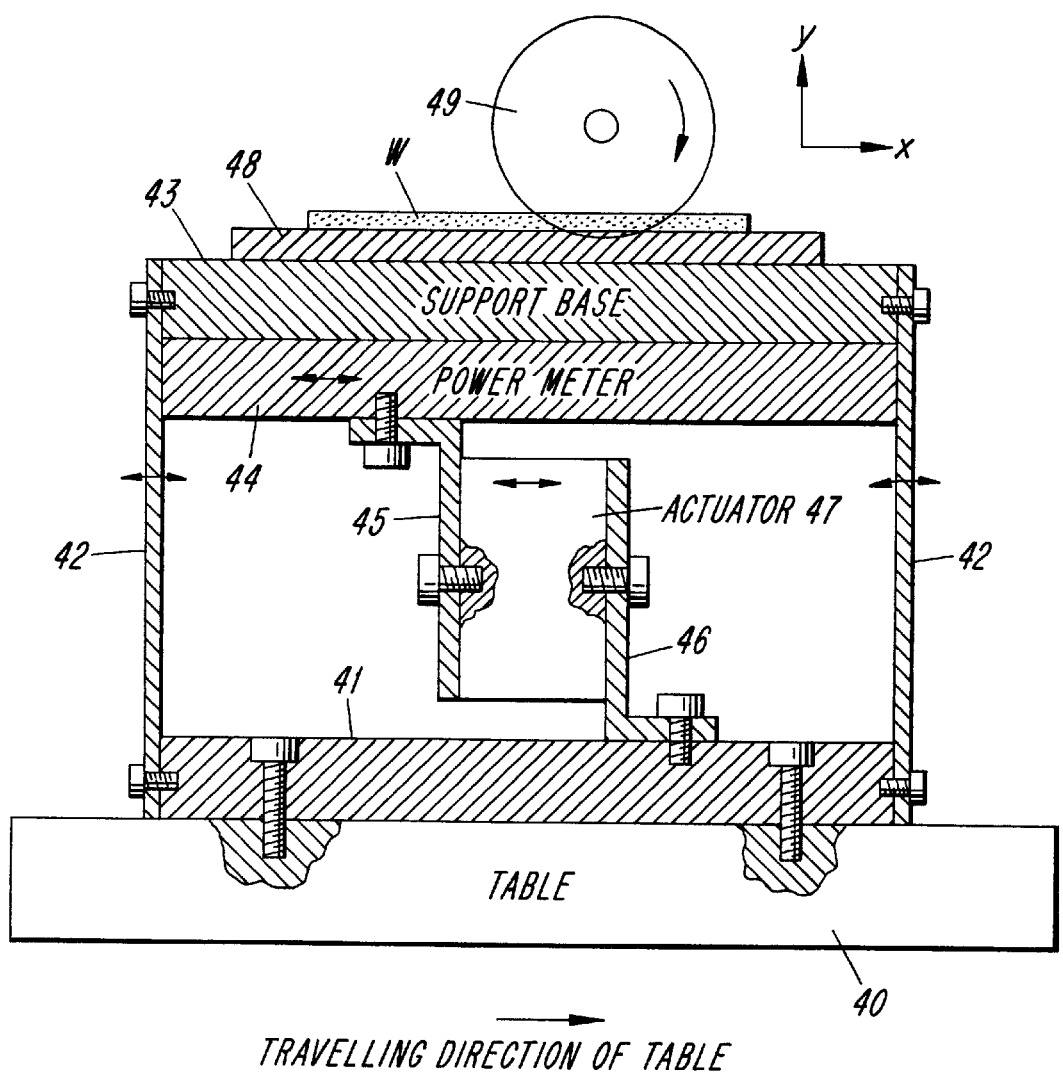
FIG. 5 is a side view diagram of a second exemplary embodiment of the slicing apparatus of the invention.

FIG. 5 shows a second exemplary embodiment of the slicing apparatus of the present invention.

This embodiment performs x-axis directional deforming control. More specifically, a mount base 41 is secured on a table 40 which is driven at a constant rate in the x-axis direction. A pair of upwardly elongated plate springs 42 are fixedly attached at the opposite side ends of the mount base 41. A support base 43 of the vacuum chuck type is secured between the upper edge portions of the plate springs 42. A piezoelectric power meter 44 for detection of x-axis load component is rigidly adhered to a bottom surface of the support base 43. A piezoelectric actuator 47 for x-axis directional drive is secured by brackets 45, 46 between the power meter 44 and the mount base 41. Due to this structure, when driving the piezoelectric actuator 47, the plate springs 42 bend or deflect in the forward and reverse directions enabling the support base 43 and power meter 44 to deform together with respect to the table 40 in the x-axis direction.

Numeral 48 designates a self-adhesive sheet which holds a to-be-machined object such as a ceramic wafer, and numeral 49 indicates a slicing blade.

The slicing apparatus of this embodiment also has a control circuit (not shown) which is similar to that of the slicing apparatus as depicted in FIG. 2. More specifically, the control circuit is comprised of a charge amplifier for conversion of a detection signal of the power meter 44 to a corresponding electrical signal, a filter for extracting only a cut-away resistance component out of an output of the charge amplifier, and an amplifier for phase-inversion of the cut-away resistance component thus extracted by the filter. Those skilled in the art will recognize that additional or different processing units can be employed. The control circuit generates an output control voltage which is fed to the piezoelectric actuator 47. Where the x-axis directional cut-away resistance F is positive, it is possible by causing the piezoelectric actuator 47 to shrink in the x-axis direction to reduce the cut-away resistance, or alternatively to reduce its peak value.

FIG. 6 shows a third exemplary embodiment of the slicing apparatus of the present invention.

Like the second embodiment, this embodiment also carries out x-axis directional deforming control, wherein like parts or components are designated by like reference numerals with a detailed explanation thereof being omitted below.

In this embodiment, the support base 43 of the vacuum chuck type is alone secured between the upper edge portions of the plate springs 42. This embodiment further comprises an assembly comprised of the x-axis directionally detectable piezoelectric power meter 44 and x-axis directionally driving piezoelectric actuator 47, which are closely bonded together. This assembly is rigidly adhered via brackets 45, 46 between the support base 43 and the mount base 41.

In this embodiment it is also possible to reduce the cut-away resistance in the x-axis direction or reduce its peak value in a way similar to that of the second embodiment.

It should be noted that the present invention should not be exclusively limited to the foregoing embodiments. As the to-be-machined object for use in the invention, wafers may be used made of different materials other than ceramics, such as silicon wafers. Further, regarding the shape of the to-be-machined objects, increased-thickness objects may also be employed other than thin wafers.

The term "cutting" as used herein encompasses a variety of different severing techniques, or can comprise simply forming grooves in the object (without cutting through the object).

Although in the second and third embodiments the support base is x-axis directionally deformably supported by use of plate springs, these springs may be replaced with either levers or arms which are capable of swinging or pivoting in the x-axis direction. In any case, insofar as intended deformation remains minute in amount, it is possible to deform the device in the x-axis direction with enhanced response while simultaneously retaining the support base in the horizontal state. Furthermore, as the support method permitting deformability of the support base, a slide rail structure may be used which enables the base to freely slide in the x-axis direction.

In the first to third embodiments stated above, only a single directional deforming control such as x-axis direction or y-axis direction has been explained. However, it is also possible to simultaneously achieve dual, x- and y-axis directional deforming control by combining the first embodiment and second embodiment or by combining the first and third embodiments.

As apparent from the foregoing description, according to the present invention, a variable load that the to-be-machined object receives is detected during slicing while forcing the to-be-machined object to deform in the direction which permits reduction of its variable load. This has the advantage of reducing the occurrence of any cracking and chipping of such to-be-machined object without reducing the machining or processing speed thereof.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A slicing method for cutting a to-be-machined object, wherein said to-be-machined object is supported on a table which travels in an x-axis direction during which a slicing device cuts said to-be-machined object, wherein said x-axis direction is perpendicular to a y-axis direction, comprising the steps of:

cutting said to-be-machined object;

detecting a variable load received by the to-be-machined object during cutting; and adjusting a deformable force applied to said to-be-machine object in response to said detected variable load;

wherein said detecting step detects a variable load with respect to both said x-axis and y-axis directions, and said adjusting step adjusts a force applied to said to-be-machined object in both of said x-axis and y-axis directions.

2. The slicing method according to claim 1, wherein said adjusting step counteracts effects of said variable load detected in said detecting step so as to reduce degradation in said to-be-machined object during cutting.

3. The slicing method according to claim 1, wherein said adjusting step reduces a peak variation in said variable load.

4. The slicing method according to claim 1, wherein said cutting of said to-be-machined object severs said to-be-machined object into plural components.

5. The slicing method according to claim 1, wherein said cutting of said to-be-machined object forms grooves in said to-be-machined object.

6. The slicing method according to claim 1, wherein said step of detecting a variable load comprises the steps of:

generating an electrical charge signal which is proportional to a force imposed on said to-be-machined object during cutting;

amplifying said charge signal to generate a signal $V_1$;

filtering said signal $V_1$ to extract a cut-away resistance component represented by a signal $V_2$; and amplifying and inverting said signal $V_2$ to generate a signal $V_3$, wherein said signal $V_3$ is used in said adjusting step to adjust a force applied to said to-be-machined object.

7. The slicing method according to claim 1, wherein said adjusting step adjusts the force applied to said to-be-machined object in said x-axis direction based on the detected variable load with respect to said x-axis, and adjusts the force applied to said to-be-machined object in said y-axis direction based on the detected variable load with respect to said y-axis.

8. The slicing method according to claim 7, wherein said detecting step uses two separate actuators to measure variable load in said x-axis and y-axis directions, respectively.

9. The slicing method according to claim 1, wherein a plurality of chips are produced as a result of said cutting step.

10. The slicing method according to claim 6, wherein said steps of generating, amplifying and filtering are performed for detected variable load in the x-axis direction, and are also performed separately for detected variable load in the y-axis direction.

* * * * *